(12) United States Patent
Koteich et al.

(10) Patent No.: US 11,843,338 B2
(45) Date of Patent: Dec. 12, 2023

(54) VARIABLE SPEED DRIVE CONTROL

(71) Applicant: Schneider Toshiba Inverter Europe SAS, Pacy sur Eure (FR)

(72) Inventors: Mohamad Koteich, Vernon (FR); Thomas Devos, Carrières-sous-Poissy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 17/837,309

(22) Filed: Jun. 10, 2022

(65) Prior Publication Data

US 2023/0006597 A1    Jan. 5, 2023

(30) Foreign Application Priority Data

Jun. 30, 2021 (EP) .................................. 21305899

(51) Int. Cl.
*H02P 27/08* (2006.01)
*H02P 23/12* (2006.01)

(52) U.S. Cl.
CPC ............ *H02P 27/085* (2013.01); *H02P 23/12* (2013.01); *H02P 2201/03* (2013.01)

(58) Field of Classification Search
CPC .... H02P 27/085; H02P 23/12; H02P 2201/03; H02P 21/05; H02P 23/04; H02P 29/50; H02P 27/06; H02M 1/15; H02J 3/002
USPC .................................................. 318/729, 727
See application file for complete search history.

(56) References Cited

U.S. PATENT DOCUMENTS 7,932,693 B2 * 4/2011 Lee .................... H02M 7/53875
 318/727
9,257,895 B2 * 2/2016 MacLennan ........ H01F 27/2895
9,446,668 B2    9/2016 Bachmaier et al.

FOREIGN PATENT DOCUMENTS

EP        3255776 A1    12/2017
EP        3832867 A1     6/2021

OTHER PUBLICATIONS

European Search Report and Search Opinion dated Dec. 15, 2021 for corresponding European Patent Application No. EP21305899.3, 7 pages.

* cited by examiner

*Primary Examiner* — David Luo
(74) *Attorney, Agent, or Firm* — Locke Lord LLP

(57) ABSTRACT

Examples include a method for controlling a variable speed drive driving an electric motor. The variable speed drive is connected to an electric power source and comprises a passive DC-link and an inverter stage controlled by a first controller of the variable speed drive. The passive DC-link is connected to the inverter stage. The method comprises running the electric motor to reach a steady-state operating point, measuring a plurality of values of current or voltage of the passive DC-link, and computing, by a second controller, a frequency spectrum of the DC-link based on the plurality of values of current or voltage measured. The method further comprises detecting a specific resonance frequency by comparing amplitudes of the frequency spectrum to a predetermined pattern, and modifying filter parameters of a digital filter of the DC-link or control parameters of a control law of the electric motor based on the specific resonance frequency.

15 Claims, 7 Drawing Sheets

VARIABLE SPEED DRIVE CONTROL

FIELD OF THE INVENTION

This invention relates to a method for controlling a variable speed drive.

BACKGROUND

Numerous electric motors connected to an electric network are driven by a variable speed drive. A variable speed drive allows modifying a frequency, amplitude and/or phase of an electric signal provided by an electric network in order to control an electric motor. More precisely, a variable speed drive comprises a DC-link stage and an inverter stage. The DC-link stage may induce, among others, oscillations at a resonance frequency which may introduce issues in the electric motor control.

The present invention improves this situation.

SUMMARY

An object of the present disclosure is to propose a method for controlling a variable speed drive driving an electric motor, the variable speed drive being connected to an electric power source, the variable speed drive comprising a passive DC-link and an inverter stage, the inverter stage being controlled by a first controller of the variable speed drive, the passive DC-link being connected to the inverter stage, the method comprising:
  running, by the variable speed drive, the electric motor to reach a steady-state operating point;
  measuring, by the variable speed drive, in response to reaching the steady state, a plurality of values of current or voltage of the passive DC-link;
  computing, by a second controller, a frequency spectrum of the DC-link based on the plurality of values of current or voltage measured;
  detecting, by the second controller, a specific resonance frequency by comparing amplitudes of the frequency spectrum to a predetermined pattern; and
  modifying, by the first controller, filter parameters of a digital filter of the DC-link or control parameters of a control law of the electric motor based on the specific resonance frequency.

Modifying control parameters or filter parameters during the control of the electric motor after detecting a specific resonance frequency allows reducing negative impact, for example electrical and/or mechanical damages, induced by undesired oscillations at a resonance frequency in both the variable speed drive and the electric motor. Moreover, the oscillations of the system (variable speed drive and motor) may be corrected in real time. Hence, the overall performance of the system may be optimized or improved in real time. Such optimization or improvement can be applied regardless of the components composing the DC-link (i.e. regardless of the topology of such variable speed drive) since the parameters may be modified depending on the situation.

Optionally, the method further comprises determining a line inductance based on the specific resonance frequency. In such an option, the line inductance may also be determined based on a value of DC-link components of the variable speed drive. Determining the line inductance provides information regarding the components of the electric system, and can permit observing a deviation in value potentially linked to a component health issue.

Optionally, the first controller modifies filter parameters of the digital filter of the DC-link and control parameters of the control law of the electric motor. This allows optimizing or improving the performance of the system by aiming at obtaining a good balance between a stability of the DC-link and an efficiency of the electric motor control.

Optionally, detecting the specific resonance frequency by comparing amplitudes of the frequency spectrum to a predetermined pattern comprises determining whether an amplitude of the frequency spectrum exceed a predetermined threshold. Determining whether an amplitude of the frequency spectrum exceed such a predetermined threshold allows detecting an amplitude associated to a resonance frequency.

Optionally, control parameters of the control law of the electric motor are modified and control parameters of the control law comprises at least one of a bandwidth of a control feedback loop of the electric motor, and a duty cycle of a pulse width modulation function. Modifying a bandwidth of the control feedback loop and a duty cycle of the pulse width modulation respectively allows attenuating the resonance of the DC-link.

Optionally, filter parameters of the digital filter are modified, and filter parameters of the digital filter comprises at least one of a cut-off frequency and a gain of the filter. This allows moving the filter in frequency to filter the detected resonance frequency and modifying its attenuation.

Optionally, the method further comprises triggering an alert. The alert may for example warn an operator of the system or a manufacturer of the variable speed drive of a detected resonance frequency.

Optionally, an alert comprises at least one of providing advices to modify the filter parameters and the control parameters, sending an alert message, playing an alert song, and displaying an alert icon. Providing advices to modify the filter and control parameters allows for example an operator to optimize or improve the performance of the system, i.e. by ensuring or seeking a compromise between a DC-link stability and an efficient control of the electric motor. Sending an alert message allows warning interested persons or control systems of a detection of a resonance frequency. Playing an alert song and displaying an alert icon both allows warning, for example, operators located close to the system.

Optionally, the method further comprises receiving a specific operating point, and running the electric motor to reach a steady-state operating point corresponds to running the electric motor to reach a steady-state of the specific operating point. This allows an operator to choose a specific operating point adapted for example to a specific application while verifying that such operating point does not induce a resonance effect.

Optionally, the method comprises a further iteration when a new operating point is detected. Further iterating the method when changing the operating point allows optimizing or improving performance of the system at different operating points adapted to different applications.

The present disclosure also presents a computer-readable storage medium comprising instructions which, when executed by at least one controller, cause the controller to carry out any one of the methods presented hereby. The controller may be embedded in the variable speed drive.

The present disclosure also describes a computer program product comprising instructions which, when the program is executed by a computer, cause the computer to carry out any one of the methods hereby described.

The present disclosure finally describes a processing system comprising a variable speed drive, a first controller and a second controller wherein the variable speed drive comprises a DC-link and an inverter stage and wherein the processing system is adapted to implement any of the methods hereby described.

Optionally, the variable speed drive comprises the first controller, the second controller is remote from the variable speed drive and the first controller comprises a first communication unit adapted to communicate with a second communication unit of the second controller. Therefore, the first controller embedded in the variable speed drive can have a relatively reduced computing power compared to the second controller whereby more complex computations may take place at the second controller. This can allow reducing an overall cost of the drive.

Alternatively, the first and the second controller are a same controller and the variable speed drive comprises said same controller. In this alternative, the processing system to implement the different methods is rendered less complex, which can facilitate maintenance operations.

DETAILED DESCRIPTION

The disclosure applies to a method for controlling a variable speed drive driving an electric motor. Variable speed drives comprise a passive direct voltage link, DC-link, which may induce undesired oscillations at a resonance frequency during the control of the electric motor. The resonance frequency depends, among others, on a topology of the variable speed drive and may appear at different operating points of the electric motor. Hence, the control of the electric motor by the variable speed drive may be disturbed due to oscillations at the resonance frequency. The method is to mitigate negative impacts of the undesired oscillations at the resonance frequency in the control of the electric motor. The proposed method therefore detects the resonance frequency and modifies control parameters of a control law of the electric motor and/or filter parameters of a digital filter applied on measured value of the DC-link depending on the detected resonance frequency. The modification of the parameters of the variable speed drive allows limiting the amplitude of the oscillations at the resonance frequency to stabilize the voltage in the DC-link while seeking to keep a good reaction time of the control law of the electric motor. The method can be used regardless of the topology of the variable speed drive and does not need to stop the electric motor to be implemented, i.e. the method can be implemented in real time for different operating points.

Figure 1:
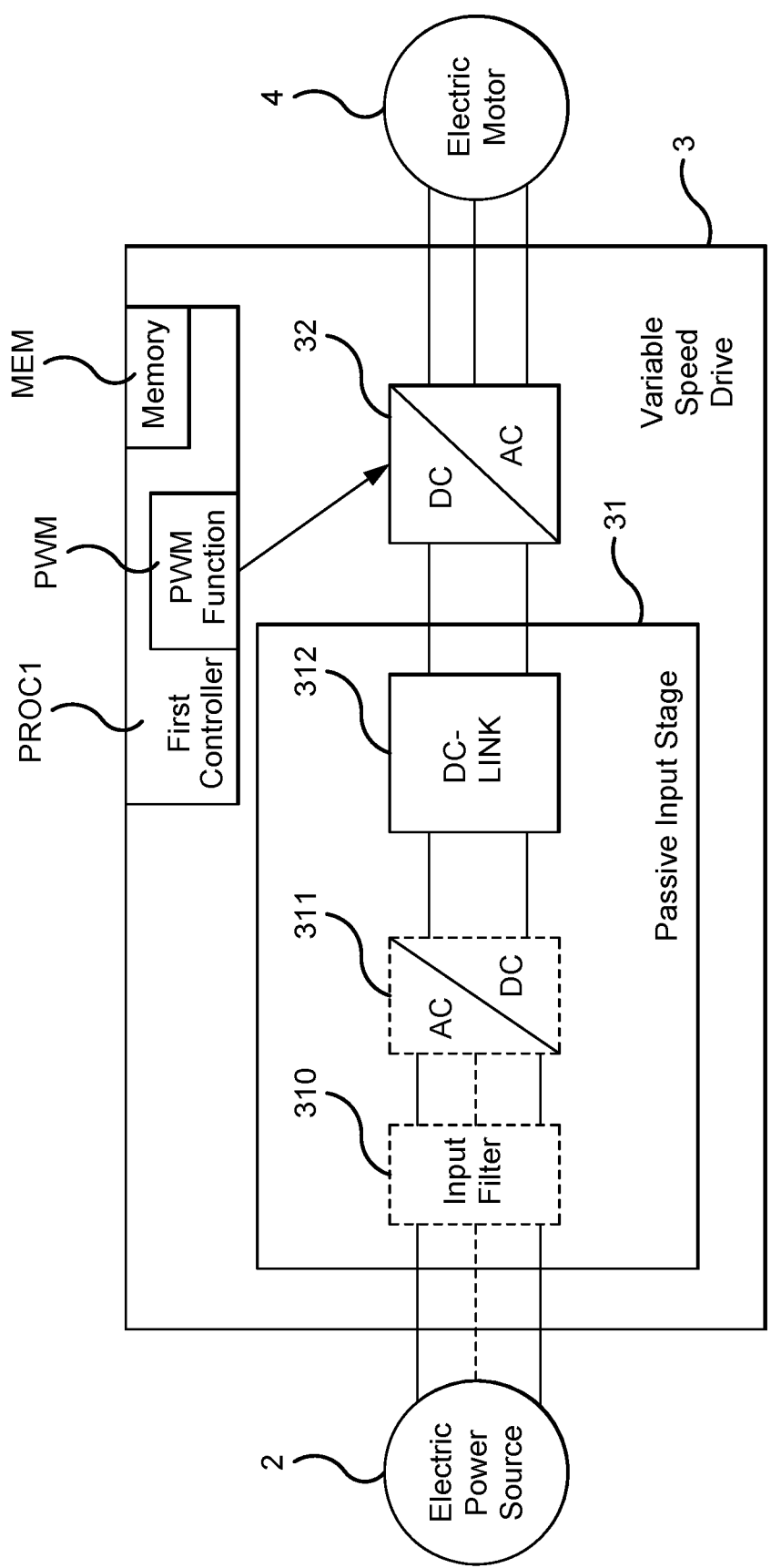
FIG. 1 illustrates an example of an architecture comprising a variable speed drive for controlling an electric motor.

An example of an architecture whereby the method could be applied is described below with reference to FIG. 1.

The circuit may comprise an electric power source 2, a variable speed drive 3 and an electric motor 4.

The electric power source 2 may correspond to a battery supplying a direct voltage DC or to an electric network supplying either an alternating voltage AC or a direct voltage DC. The alternating voltage AC may for example comprise two or three phases. The power source 2 may, for example, be a three-phase electric network as illustrated in FIG. 1.

An electric motor 4 should be understood in this disclosure as any kind of electric motors which may be driven by a variable speed drive. The electric motor may be a motor controlled by an alternating voltage, for example, an induction motor. In some examples, the electric motor may be a synchronous electric motor or an asynchronous electric motor. In some examples, the electric motor may be a direct current motor.

A variable speed drive 3 should be understood in this disclosure as an electronic, electrical, virtual or software implemented control unit for an electric motor. A variable speed drive may control an electric motor 4 using an electric or electronic command and in particular may apply a determined voltage to the motor.

The variable speed drive may comprise a passive input stage 31. The passive input stage connects the electric power source 2 to an inverter stage 32 of the variable speed drive 3. By passive input stage, it should be understood here an electronic or electrical stage connecting the electric power source 2 to the inverter stage 32 whereby the electronic or electrical stage comprises passive electronic or electrical components, i.e. non-controlled electronic or electrical components.

The passive input stage 31 comprises a passive DC-link 312. The DC-link may be defined as a circuit configured to stabilize the voltage of a direct power bus, DC bus, supplying the inverter stage 32. The DC-link can therefore comprise an electrolyte capacitor, a DC-choke or a small film capacitor.

An electrolyte capacitance, which the order of magnitude is 100 µF/kW, allows stabilizing the voltage of the power bus but may have a reduced total harmonic distortion, THDI.

Adding a DC-choke, i.e. adding a choke inductor allows having a better THDI but increases the cost and the size of the DC-link while cooling means of the DC-link may have to be improved. A variable speed drive comprising a choke inductor comprises a DC-choke topology.

Having a small film capacitor, the order of magnitude of which is 15 µF/kW, improves the THDI but decreases the voltage stabilization and therefore challenges the control of the electric motor by the variable speed drive. A variable speed drive comprising a small film capacitor comprises a C-less topology.

In some examples, the passive input stage 31 may comprise a passive rectifier 311, such rectifier being intended to convert an alternating voltage AC supplied by the power source 2 into a direct voltage DC. As the electric power source 2 may already supply a direct voltage DC, the passive rectifier is an option as represented by the dotted lines in FIG. 1. In some examples, a passive rectifier may be a diode rectifier.

In examples wherein the electric power source is a single-phase alternating power source, a passive rectifier may comprise two arms, each arm having a top diode and a bottom diode, the passive rectifier therefore corresponding to a four-diode rectifier.

In examples wherein the electric power source is a three-phase alternating power source, a passive rectifier may comprise three arms, each arm having a top diode and a bottom diode, the passive rectifier therefore corresponding to a six-diode rectifier.

In some examples, the passive input stage 31 may also comprise an input filter 310. The input filter may be connected in one side to an alternating power source 2 and on the other side to the passive rectifier. The input filter may comprise an AC line choke or an LC filter (Inductor-Capacitor filter) for filtering harmonics. A variable speed drive comprising an input filter comprises an input filter topology.

The variable speed drive may also comprise electric measuring means (not shown) adapted to measure at least one of voltage and current values in the DC-link. Measuring means may for example correspond to an ammeter or a voltmeter.

In some examples, a variable speed drive comprises a first controller PROC1 intended to implement a control law by taking into account, for example, an input speed set point, a voltage set point, a current set point or a torque set point to be applied to the electric motor during normal operation of the motor and control instructions to be applied to an inverter stage 32 in order to obtain corresponding output voltages. The control law may be of a vector or of a scalar type.

The inverter stage 32 is intended to cut off the voltage supplied by the DC-link into a variable voltage to control the electric motor 4. The inverter stage may, for example, comprise multiple switching legs, each comprising controlled power transistors, for example of Insulated Gate Bipolar Transistors, IGBT, type, for applying the variable voltage to the electric motor.

In some examples, the inverter stage 32 may comprise 3 legs, each leg comprising a top switch and a bottom switch, i.e. six switches. A switch comprises an IGBT and a freewheeling diode connected in parallel of the IGBT. A middle point of each leg, corresponding to a point between the bottom switch and the top switch, is connected to a respective phase of the electric motor 4.

The inverter stage and in particular its controlled transistors may be controlled by the first controller PROC1, for example, by implementing a PWM (Pulse Width Modulation) function. The control law performed by the first controller PROC1 makes it possible to determine the voltage to be applied to the output phases intended to be connected to the electric motor to be controlled. The processor PROC1 may also be adapted to implement a digital filter (not shown) on the DC-link of the variable speed drive.

The first controller PROC1 may for example correspond to a microcontroller or to a digital signal controller, DSC, the latter combining features of a microcontroller and of a digital signal processor, DSP.

Figure 3A:
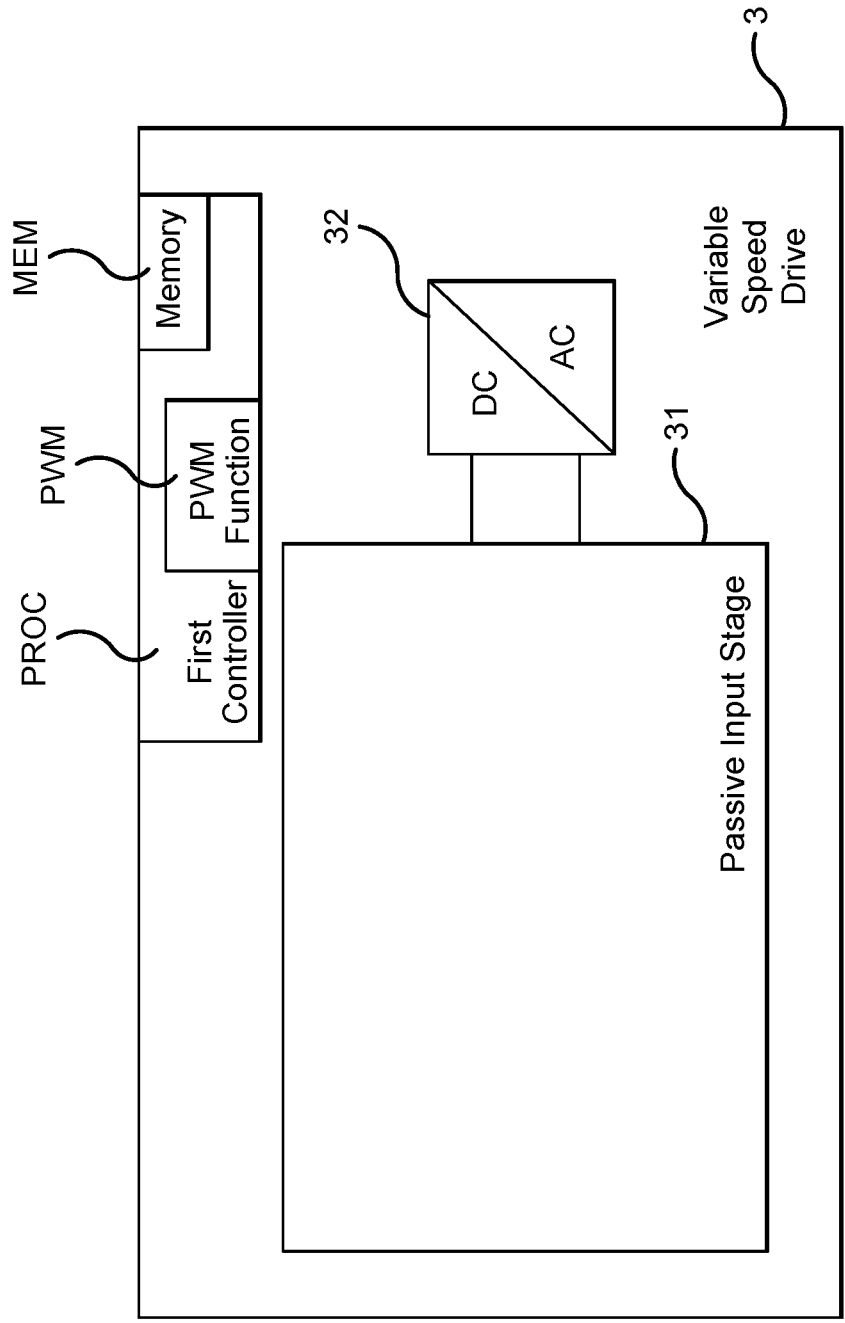
FIG. 3a illustrates a first example of a processing unit adapted to implement the example method for controlling a variable speed drive driving an electric motor.
Figure 3B:
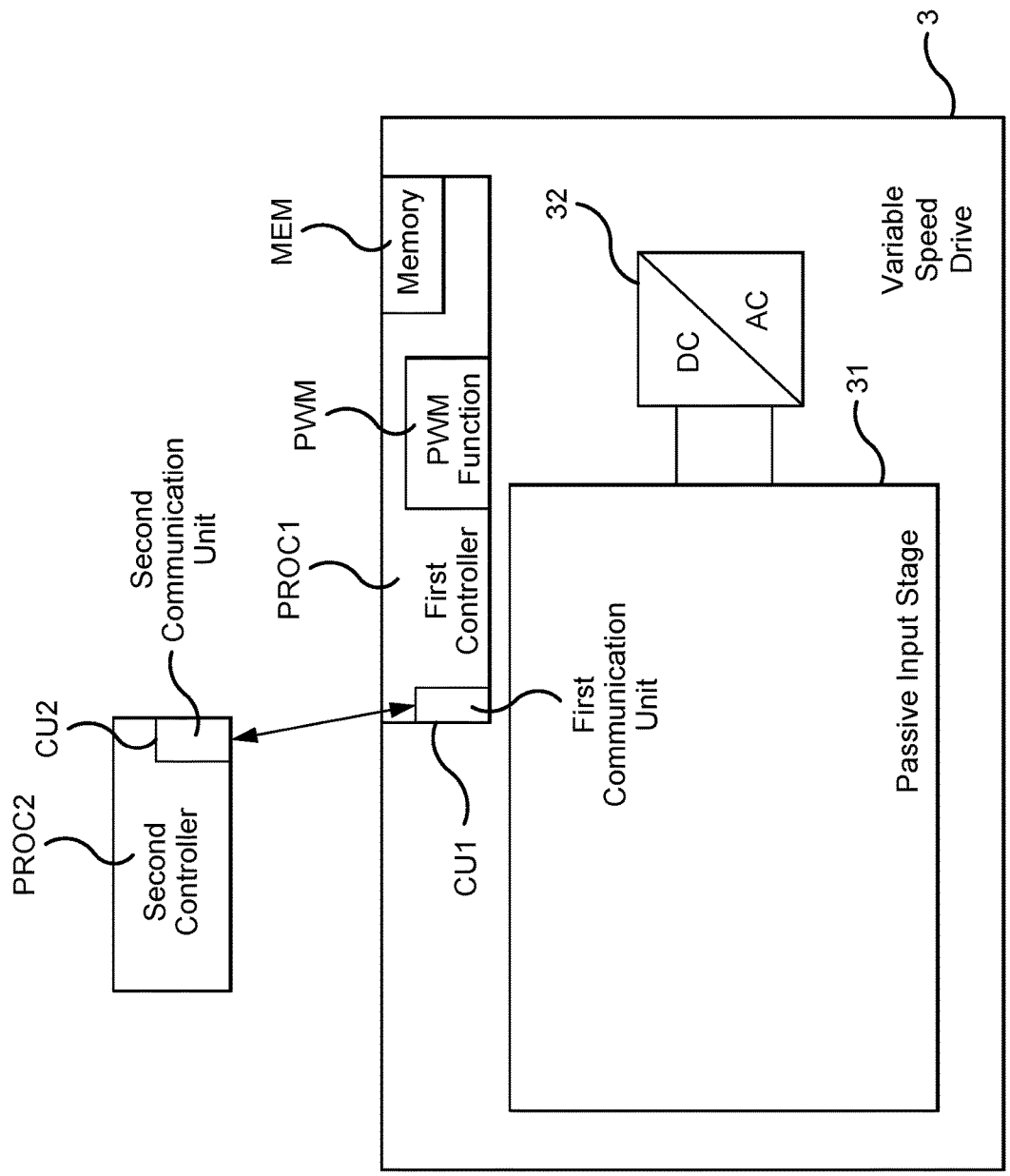
FIG. 3b illustrates a second example of a processing unit adapted to implement the example method for controlling a variable speed drive driving an electric motor.

As illustrated for example on FIG. 3b, in some examples the first controller PROC1 may comprise a first communication unit CU1 adapted to communicate with a second communication unit CU2 of a second controller PROC2 remote from the variable speed drive. In such examples, the first controller PROC1 may be a microcontroller and the second controller PROC2 may be a DSP. In some other examples, the first and the second controller are a same controller and the variable speed drive comprises said same controller. The same controller may be a DSC. Both first CU1 and second CU2 communication units may for example corresponds to a receiving/transmitting equipment adapted to exchange radiofrequency waves.

The variable speed drive 3 may also comprise a non-transitory machine-readable or computer readable storage medium, such as, for example, memory or storage unit MEM, whereby the non-transitory machine-readable storage medium is encoded with instructions executable by a processor such as the first controller PROC1, the machine-readable storage medium comprising instructions to operate the first controller PROC1 to perform at least part of the example methods hereby described. A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described. Storage or memory may include any electronic, magnetic, optical or other physical storage device that stores executable instructions as described hereby.

Figure 2:
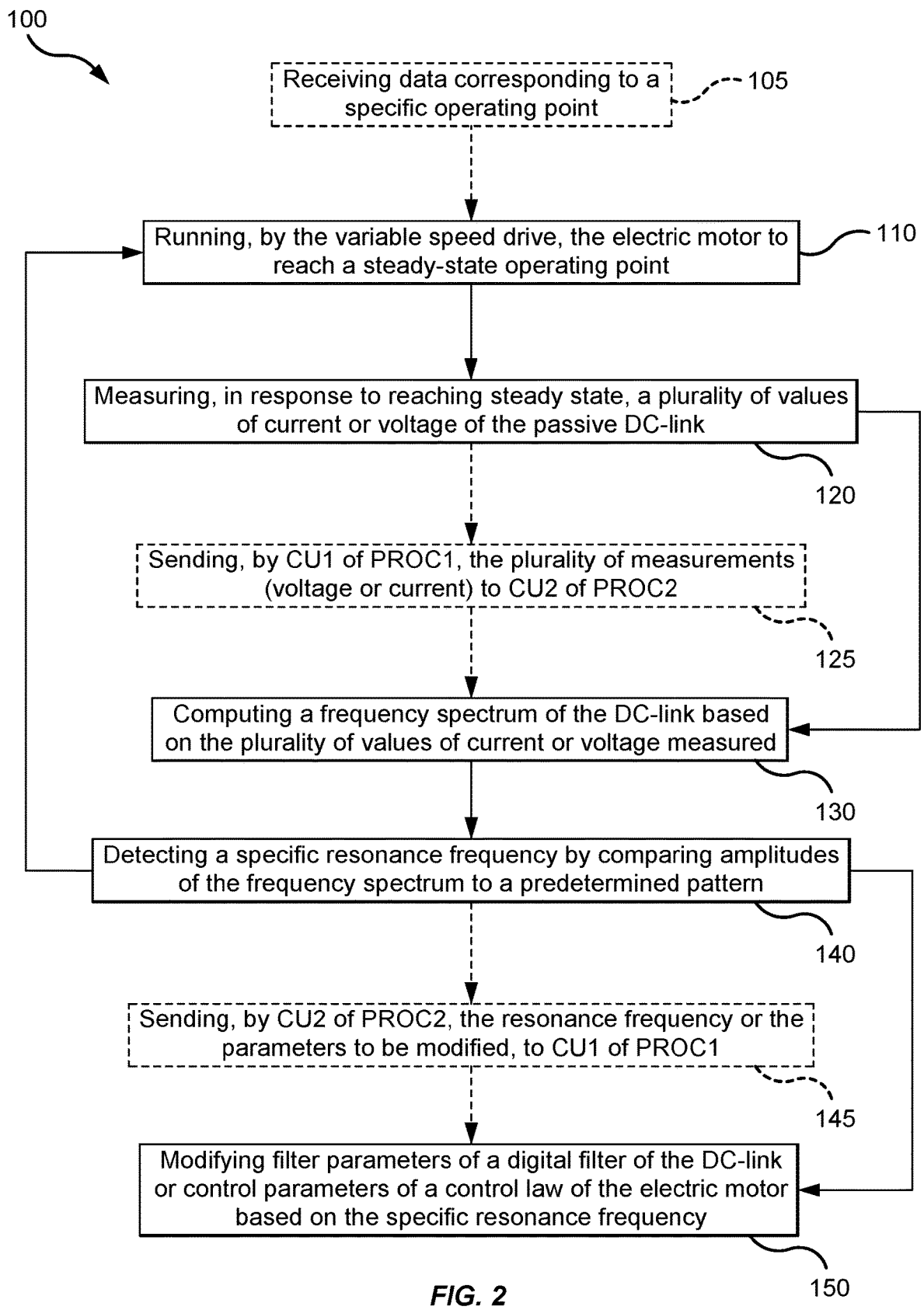
FIG. 2 illustrates an example method for controlling a variable speed drive driving an electric motor.

An example method 100 for controlling the variable speed drive 3 driving the electric motor 4 is described below with reference to FIG. 2. The example method 100 may be implemented by a processing system comprising the variable speed drive 3, the first controller PROC1 and the second controller PROC2. Examples of such processing systems are represented in FIGS. 3a and 3b. In the example illustrated in FIG. 3a, the first controller and the second controller are a same controller PROC comprised in the variable speed drive 3. In the example illustrated in FIG. 3b, the first controller PROC1 comprises the first communication unit CU1 adapted to communicate with the second communication unit CU2 of the second controller PROC2, as illustrated by the bidirectional arrow, and the second controller PROC2 is remote from the variable speed drive. Hence, a distinction is made between first PROC1 and second PROC2 controllers in the present disclosure to indicate that at least a part of the example method 100 can be remotely implemented by a controller. However, it should be understood that first and second controller could also correspond to a same controller PROC embedded in the variable speed drive as illustrated in FIG. 3a.

As illustrated in bloc 110, the method 100 comprises running, by the variable speed drive, the electric motor 4 to reach a steady-state operating point. An operating point of the electric motor 4 may comprise a speed and a torque of the electric motor. A speed of the electric motor may be expressed in rotations per minute (rpm) and may be comprised between 0 and 10000 rpm and preferably between 1000 and 3000 rpm. A torque of the electric motor may be expressed in Newton-metre (Nm) and may be comprised between 0 and 10 kNm and preferably between 0 and 1000 Nm. In some examples, the torque of the electric motor corresponds to an electromagnetic torque of the electric motor. In some examples, an operating point may be determined based on a data of a motor nameplate of the electric motor. Reaching a steady-state operating point of the electric motor 4 means that the speed and the torque of the electric motor 4 respectively reach a significantly constant value. This operation is performed by the variable speed drive, for example by applying an adapted duty cycle of a PWM or by applying adapted parameters of the control law.

In some examples and as represented in bloc 105, the method 100 may previously comprise receiving data corresponding to a specific operating point. The data corresponding to a specific operating point may for example be sent by a controller external to the variable speed drive, such as the second controller PROC2, or by a programmable logic controller (PLC), or be provided by an operator. In alternative or complementary examples, the variable speed drive may store data corresponding to default operating points for a commissioning sequence of the drive. In these examples, running the electric motor to reach a steady-state operating point may correspond to running the electric motor to reach a steady-state corresponding to the specific operating point or to a default operating point.

As illustrated in bloc 120, the method 100 comprises measuring, in response to reaching the steady state, a plurality of values of current or voltage of the passive DC-link. The plurality of values may for example comprise at least 5 values and preferably at least 100 values. The bloc 120 is performed by the variable speed drive, for example using adapted measuring means depending on the measured physical quantity.

In some examples wherein the plurality of values concerns current values, the variable speed drive may perform the measurements using an ammeter. In some other examples wherein the plurality of values concerned voltage values, the variable speed drive may perform the measurements using a voltmeter.

As illustrated in bloc 130, the method 100 comprises computing a frequency spectrum of the DC-link based on the plurality of values of current or voltage measured. The frequency spectrum may be determined based on a discrete Fourier transform (DFT) or based on a fast Fourier transform (FFT) using the plurality of measured values.

This bloc may be performed by the same controller PROC in FIG. 3a or by the second controller PROC2, remote from the variable speed drive, in FIG. 3b. In the example wherein the second controller remote from the variable speed drive performs the bloc 130, the example method previously comprises sending, by the first communicating unit CU1 of the first controller PROC1, the plurality of measurements (voltage or current) to the second communicating unit CU2 of the second controller PROC2 as illustrated by the bloc 125 in FIG. 2. Indeed, computations relating to signal processing may be heavy and therefore, may be executed by a dedicated controller like a DSP remote from the variable speed drive. This allows, among others, reducing an overall cost of the variable speed drive.

As illustrated in bloc 140, the method 100 comprises detecting a specific resonance frequency by comparing amplitudes of the frequency spectrum to a predetermined pattern. This bloc may be performed by the same controller PROC of FIG. 3a or by the second controller PROC2 of FIG. 3b. Since a resonance frequency leads to undesired oscillations of the DC-link, amplitudes of the frequency lines of the frequency spectrum will be increased in a case of resonance, and could be detected by a comparison to a predetermined pattern. When the specific resonance frequency is not detected at the operating point because there is no undesired oscillations, the method 100 can be stopped or can make a loop as illustrated by the arrow linking bloc 140 to bloc 110 in FIG. 2.

In some examples, comparing amplitudes of the frequency spectrum to a predetermined pattern comprises determining whether an amplitude of the frequency spectrum exceed a predetermined threshold. A predetermined pattern can therefore comprise several predetermined thresholds. In some examples, a predetermined threshold corresponds to a frequency or to a frequency range associated to a threshold amplitude. Frequencies or frequency ranges associated to threshold amplitudes may be limited by a Shannon criterion, i.e. be limited at a half of a sampling frequency f sampling. The sampling frequency f sampling corresponds to the number of current or voltage values measured during a period of one second.

A threshold amplitude and its associated frequency or frequency range may be determined based on the electric power source. In particular, a threshold amplitude and its associated frequency or frequency range may be determined based on a voltage value $U_0$ of the DC bus and on a type of electric power source wherein the voltage value $U_0$ of the DC bus is determined based on a voltage applied by the electric power source 2. A type of the electric power source may comprise a type of applied voltage (alternating or direct voltage) and a number of phases in applicable cases.

Indeed, when the type of the electric power source comprises an alternating power source, the passive input stage of the variable speed drive comprises a diode rectifier to rectify the voltage. In such case, the diode rectifier generates amplitudes in the frequency spectrum at multiples of a fundamental frequency $f_{grid}$ of the alternating power source.

FIG. 4 illustrates some examples of predetermined patterns. In the FIGS. 4, an abscissa axis represents frequencies (expressed in Hz here) and an ordinate axis represents an amplitude (expressed in Volt here). An amplitude corresponding to the voltage value $U_0$ of the DC bus is illustrated in the ordinate axis of FIG. 4.

In some examples and as illustrated in the FIGS. 4, a predetermined pattern may comprise a $cU_0$ threshold amplitude associated to a range of frequency comprising a zero-frequency. Coefficient c is determined to be greater than 1 and may for example be comprised between 1 and 1.5. This allows avoiding detecting a resonance frequency at the zero-frequency due to perturbations in the electric power source. In some alternative examples, a lowest frequency associated to a threshold amplitude of a predetermined pattern may be greater than 0 Hz and preferably greater than 1 Hz. This means that a predetermined pattern does not comprise a threshold amplitude associated to the zero-frequency in order to avoid detecting a resonance frequency at the zero-frequency.

In some examples and as illustrated in FIGS. 4, a predetermined pattern may comprise an error threshold amplitude $eU_0$ associated to a frequency range which may start from 0 Hz and end at the sampling frequency $f_{sampling}$. The error threshold amplitude $eU_0$ may be determined in order to avoid detecting resonance frequency for weak amplitudes which do not induce significant alteration in the stability of the DC-link and in the control of the electric motor. In some examples, coefficient e may be smaller than 5% and preferably smaller than 2%.

Figure 4A:
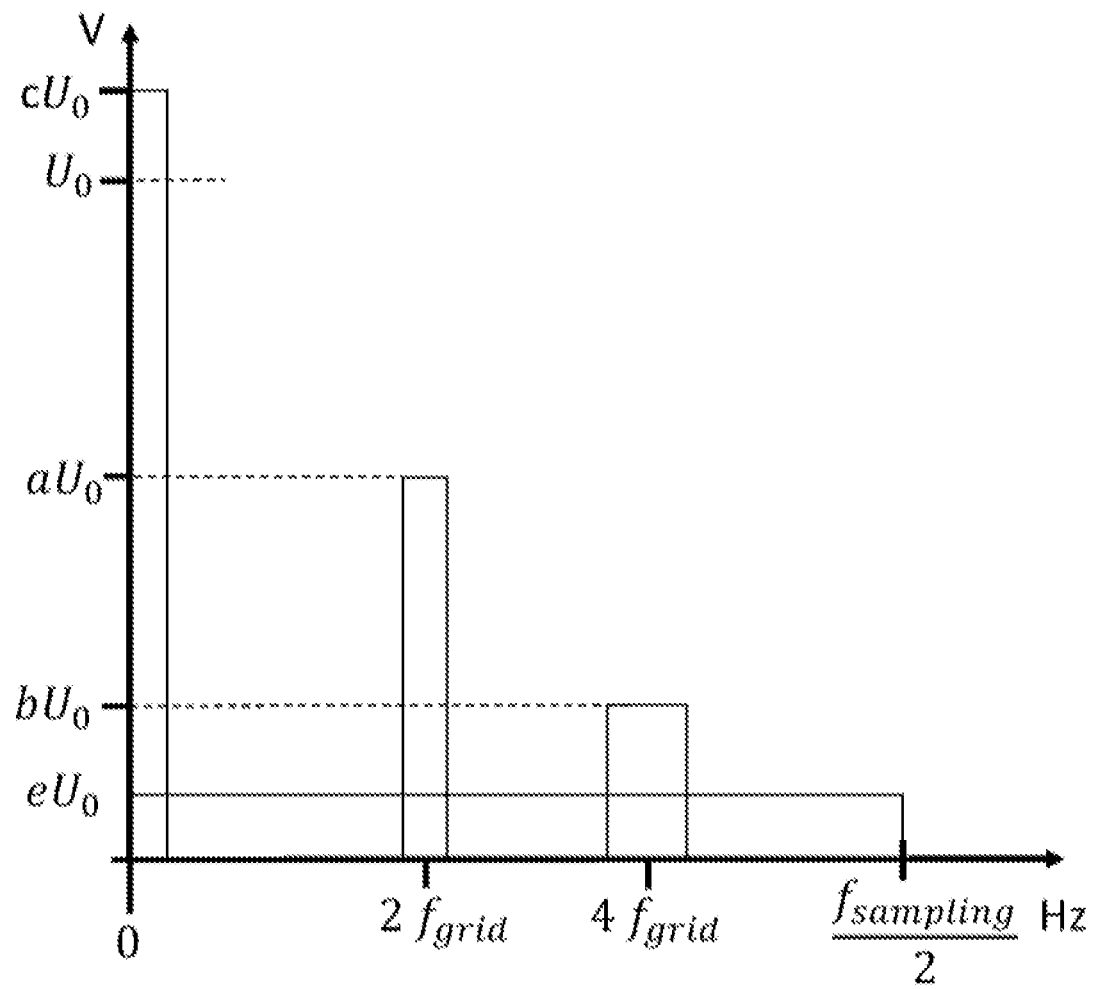
FIG. 4a illustrates a first example of predetermined pattern.
Figure 4B:
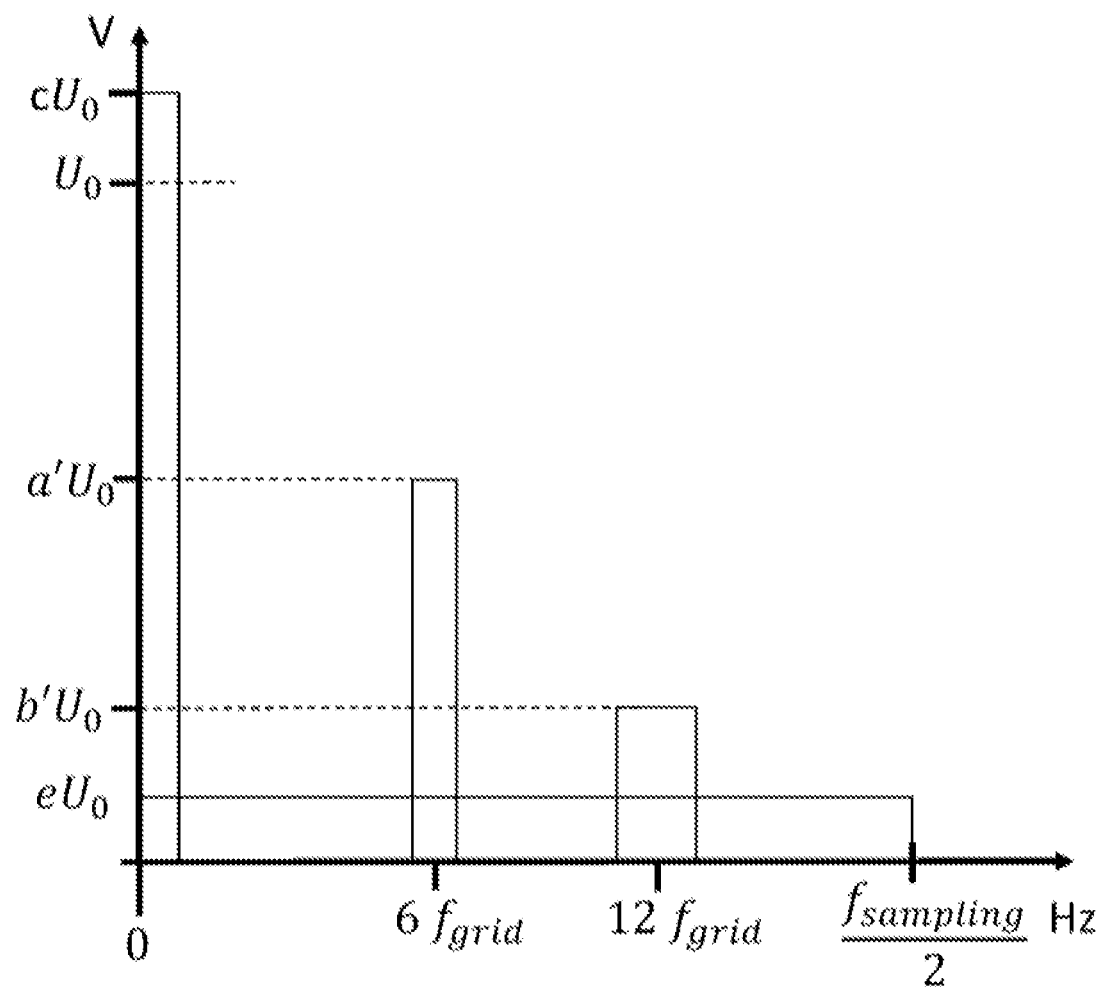
FIG. 4b illustrates a second example of predetermined pattern.

In some examples as the ones illustrated in FIGS. 4a and 4b, a predetermined pattern may comprise a threshold amplitude associated to a frequency range comprising a multiple of a fundamental frequency $f_{grid}$ of an alternating power source 2. In such examples, a frequency range comprising a multiple of the fundamental frequency $f_{grid}$ may be centered around such multiple of the fundamental frequency. A frequency range comprising a multiple of a fundamental frequency $f_{grid}$ may for example correspond to a range of 20 Hz centered around such multiple of the fundamental frequency.

In some examples, when the type of electric power source corresponds to a single-phase alternating power source, a predetermined pattern may comprise threshold amplitudes associated to multiples of 2 of the fundamental frequency $f_{grid}$ of the single-phase alternating power source.

An example of a predetermined pattern whereby the type of electric power corresponds to a single-phase alternating power source is illustrated in FIG. 4a. The predetermined pattern of the example of FIG. 4a comprises a $cU_0$ threshold amplitude associated to a range of frequency comprising a zero-frequency, an error threshold amplitude $eU_0$ associated to a frequency range which starts from 0 Hz and ends at the sampling frequency $f_{sampling}$ and threshold amplitudes associated to frequency ranges respectively comprising two and four times the fundamental frequency $f_{grid}$. Indeed, when the type of electric power corresponds to a single-phase alternating power source, the passive input stage of the variable speed drive comprises a four-diode rectifier. Such four-diode rectifier induces the presence of second order harmonics. The two first second order harmonics are illustrated in the FIG. 4a but the predetermined pattern may comprise other second order harmonics. Amplitudes of second order harmonics decreases when frequency increases as illustrated for amplitude thresholds $aU_0$ and $bU_0$. Hence, a coefficient a of a first second order harmonic is greater than a coefficient b of a second order harmonic as illustrated in FIG. 4a. Coefficients associated to frequency range of second order harmonics like a and b are comprised between 0 and 1 and decreases when the frequency increases.

In some examples, when the type of electric power source corresponds to a three-phase alternating power source, a predetermined pattern may comprise threshold amplitudes associated to multiples of 6 of the fundamental frequency $f_{grid}$ of the three-phase alternating power source.

An example of a predetermined pattern whereby the type of electric power corresponds to a three-phase alternating power source is illustrated in FIG. 4b. The predetermined pattern of the example of FIG. 4b comprises a $cU_0$ threshold amplitude associated to a range of frequency comprising a zero-frequency, an error threshold amplitude $eU_0$ associated to a frequency range which starts from 0 Hz and end at the sampling frequency $f_{sampling}$ and threshold amplitudes associated to frequency ranges comprising six and twelve times the fundamental frequency $f_{grid}$. Indeed, when the type of electric power corresponds to a three-phase alternating power source, the passive input stage of the variable speed drive comprises a six-diode rectifier. Such six-diode rectifier induces the presence of sixth order harmonics. The two first sixth order harmonics are illustrated in the FIG. 4b but the predetermined pattern may comprise other sixth order harmonics. Amplitudes of sixth order harmonics decreases when frequency increases as illustrated for amplitude thresholds $a'U_0$ and $b'U_0$. Hence, a coefficient a' of a first sixth order harmonic is greater than a coefficient b' of a second sixth order harmonic as illustrated in FIG. 4b. Coefficients associated to frequency range of sixth order harmonics like a' and b' are comprised between 0 and 1 and decreases when the frequency increases.

Figure 4C:
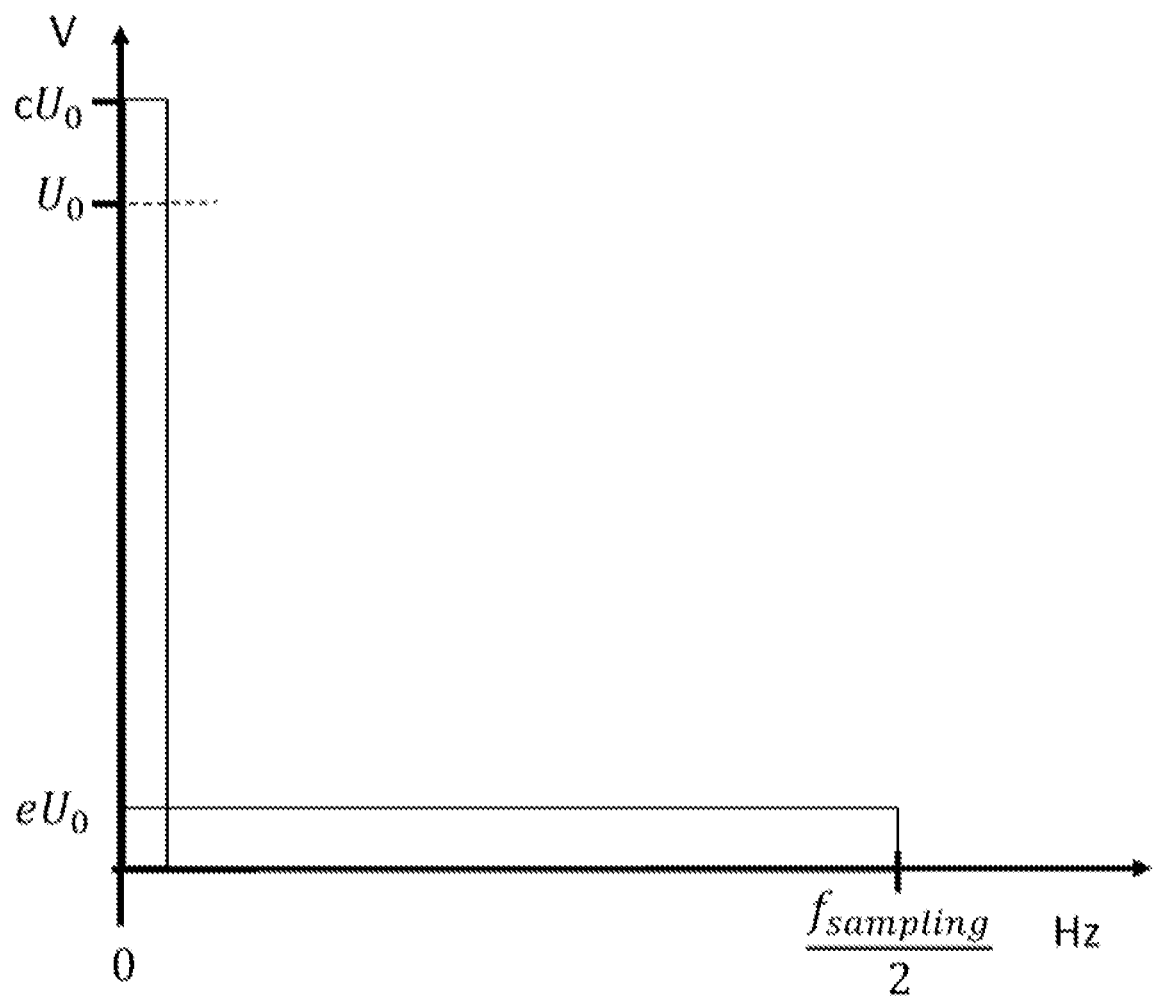
FIG. 4c illustrates a third example of predetermined pattern.

An example of a predetermined pattern whereby the type of electric power corresponds to a DC power source, for example a battery, is illustrated in FIG. 4c. The predetermined pattern of the example of FIG. 4c comprises a $cU_0$ threshold amplitude associated to a range of frequency comprising a zero-frequency, an error threshold amplitude $eU_0$ associated to a frequency range which starts from 0 Hz and end at the sampling frequency $f_{sampling}$ but does not comprise multiple of a fundamental frequency.

As illustrated in bloc 150, the method comprises modifying filter parameters of a digital filter of the DC-link or control parameters of a control law of the electric motor based on the specific resonance frequency. This bloc may be performed by the same controller PROC or by the first controller PROC1, i.e. by the controller embedded in the variable speed drive.

When the bloc 150 is performed by the first controller PROC1 in a processing system of FIG. 3b, the method may previously comprise sending, by the second communicating unit CU2 of the second controller PROC2, the resonance frequency or the parameters to be modified, to the first communicating unit CU1 of the first controller PROC1. This example is illustrated by the bloc 145 of FIG. 2.

In some examples wherein control parameters of the control law of the electric motor are modified, control parameters comprise at least one of a bandwidth of a control feedback loop of the electric motor, and a duty cycle of a pulse width modulation function. A bandwidth of a control feedback loop of the electric motor may for example comprise at least one of a speed loop bandwidth, a current loop bandwidth or a position loop bandwidth of the electric motor depending on the control law applied to the electric motor by the variable speed drive. In some examples, modifying the bandwidth of a control feedback loop of the electric motor may comprise reducing the bandwidth of the control feedback law such that the detected resonance frequency is moved out of such bandwidth. In particular, when the detected resonance frequency corresponds to a bandwidth of the control law (magnitude order of 80 Hz), for example in an input filter topology, applying a filter on the resonance frequency may disturb the functioning of the control law. In such cases, a good trade-off between stability of the DC-link and performance of the electric motor may consist to reduce the bandwidth of the control law to move the detected resonance frequency out as explained above.

In some examples wherein filter parameters of the digital filter are modified, filter parameters of the digital filter comprise at least one of a cut-off frequency and a gain of the filter. In some examples, modifying the cut-off frequency or the gain respectively comprises modifying the cut-off frequency to filter the detected resonance frequency or increasing the attenuation of the filter to attenuate the resonance frequency. In particular, when the detected resonance frequency corresponds to several hundreds of Hertz or more, for example in a C-less topology, applying a filter on the resonance frequency will not significantly affect the performance of the motor. Hence, a good trade-off between stability of the DC-link and performance of the electric motor may consist in modifying the filter parameters of the digital filter to filter the resonance frequency.

In some examples, both filter parameters of the digital filter and control parameters of the control law are modified. In some examples, the parameters are chosen to reduce the bandwidth of the control law and to modify the cut-off frequency of the digital filter to filter the resonance frequency while avoiding filtering a new bandwidth of the control law. In particular, when the detected resonance frequency corresponds to several tens of Hertz, for example in a DC-choke topology, the bandwidth of the control law may have the same order of magnitude. Filtering the resonance frequency alone may affect the control law while modifying the bandwidth of the control law alone may significantly slow the response of the electric motor. Hence, modifying both filter parameters of the digital filter and control parameters of the control law may optimize the performance of the system (drive and electric motor) by seeking a good compromise between the stability of the DC-link and the time response of the electric motor control.

In some examples, the method 100 may further comprise triggering an alert. The alert may be triggered after that a resonance frequency is detected. An alert may comprise at least one of advices to modify the filter parameters and the control parameters, sending an alert message, playing an alert song, and displaying an alert icon. Providing advices to modify the parameters of the variable speed drive may, for example, allow an operator to manually implement the modifications. Sending an alert message may, for example, allow warning operators, manufacturers or interested persons of the detection of a resonance frequency. Playing an alert song and displaying an alert icon may allow, for example, warning operators located close to the system.

In some examples, the example method 100 may further comprise determining a line inductance based on the specific resonance frequency. In such examples, the line inductance may also be determined based on a value of passive DC-link components of the variable speed drive. Values of passive DC-link components comprises value of a capacitance of the DC-link and may comprise value of a choke inductor when the variable speed drive comprises such choke inductor. Indeed, the line inductance may be obtained from the following equation:

$$Ls = \frac{1}{2}\left(\frac{1}{(4\pi^2 \times Fr^2 \times C)} - L_{dch}\right)$$

wherein

Ls corresponds to the line inductance,

Fr corresponds to the resonance frequency,

C corresponds to the capacitance of the DC-link, and $L_{dch}$ corresponds to the choke inductor.

In examples wherein the variable speed drive does not comprise a choke inductor, a value of $L_{dch}$ is null.

In some examples, when a new operating point is detected, the method 100 may comprise a further iteration. Hence, this allows optimizing the system by modifying parameters of the variable speed drive at each new operating point and for example at the specific operating point which can be determined by an operator.

Some blocs or examples of the method 100 presented above may be implemented more or less frequently than other blocs or examples. In some examples, bloc 120 is implemented more frequently than bloc 110. Some blocs or examples of the method 100 may also have a different order that the order of presentation in the present disclosure. The sequential aspect given by the FIG. 2 is not mandatory and depends on the blocs and on the examples.

The example method 100 allows therefore reducing the amplitude of the oscillations of the DC-link at the resonance frequencies. Hence, the performance of the system may be improved or optimized by at least attenuating such oscillations. The improvement or optimization can be implemented independently of the nature of components forming the DC-link of the drive. The method can therefore be applied in variable speed drives comprising passive DC-link without knowledge of said drives with a similar efficiency.

The invention claimed is:

1. A method for controlling a variable speed drive driving an electric motor, the variable speed drive being connected to an electric power source, the variable speed drive comprising a passive DC-link and an inverter stage, the inverter stage being controlled by a first controller of the variable speed drive, the passive DC-link being connected to the inverter stage, the method comprising:

running, by the variable speed drive, the electric motor to reach a steady-state operating point;

measuring, by the variable speed drive, in response to reaching the steady state, a plurality of values of current or voltage of the passive DC-link;

computing, by a second controller, a frequency spectrum of the DC-link based on the plurality of values of current or voltage measured;

detecting, by the second controller, a specific resonance frequency by comparing amplitudes of the frequency spectrum to a predetermined pattern; and modifying, by the first controller, filter parameters of a digital filter of the DC-link or control parameters of a control law of the electric motor based on the specific resonance frequency.

2. The method according to claim 1, wherein the method further comprises determining a line inductance based on the specific resonance frequency.

3. The method according to claim 2, wherein determining the line inductance is also based on a value of passive DC-link components.

4. The method according to claim 1, wherein the first controller modifies filter parameters of the digital filter of the DC-link and control parameters of the control law of the electric motor.

5. The method according to claim 1, wherein detecting the specific resonance frequency by comparing amplitudes of the frequency spectrum to a predetermined pattern comprises determining whether an amplitude of the frequency spectrum exceed a predetermined threshold.

6. The method according to claim 1, wherein control parameters of the control law of the electric motor are modified, and wherein control parameters of the control law comprise at least one of a bandwidth of a control feedback loop of the electric motor, and a duty cycle of a pulse width modulation function.

7. The method according to claim 1, wherein filter parameters of the digital filter are modified, and wherein filter parameters of the digital filter comprise at least one of a cut-off frequency and a gain of the filter.

8. The method according to claim 1, wherein the method further comprises triggering an alert.

9. The method according to claim 8, wherein the alert comprises at least one of providing advices to modify the filter parameters and the control parameters, sending an alert message, playing an alert song, and displaying an alert icon.

10. The method according to claim 1, wherein the method further comprises receiving a specific operating point and wherein running the electric motor to reach a steady-state operating point corresponds to running the electric motor to reach a steady-state of the specific operating point.

11. The method according to claim 1, wherein the method comprises a further iteration when a new operating point is detected.

12. A non-transitory computer-readable storage medium comprising instructions which, when executed by at least one controller, cause the at least one controller to carry out the method according to claim 1.

13. A processing system comprising a variable speed drive, a first controller and a second controller, wherein the variable speed drive comprises a DC-link and an inverter stage, and wherein the processing system is adapted to implement the method according to claim 1.

14. The processing system according to claim 13, wherein the variable speed drive comprises the first controller, wherein the second controller is remote from the variable speed drive, and wherein the first controller comprises a first communication unit adapted to communicate with a second communication unit of the second controller.

15. The processing system according to claim 13, wherein the first controller and the second controller are a same controller, and wherein the variable speed drive comprises said same controller.

* * * * *